T. M. CHANCE
SEPARATION OF MATERIALS OF DIFFERENT SPECIFIC GRAVITIES
Nov. 18, 1930 Original Filed June 28, 1927 Re. 17,873
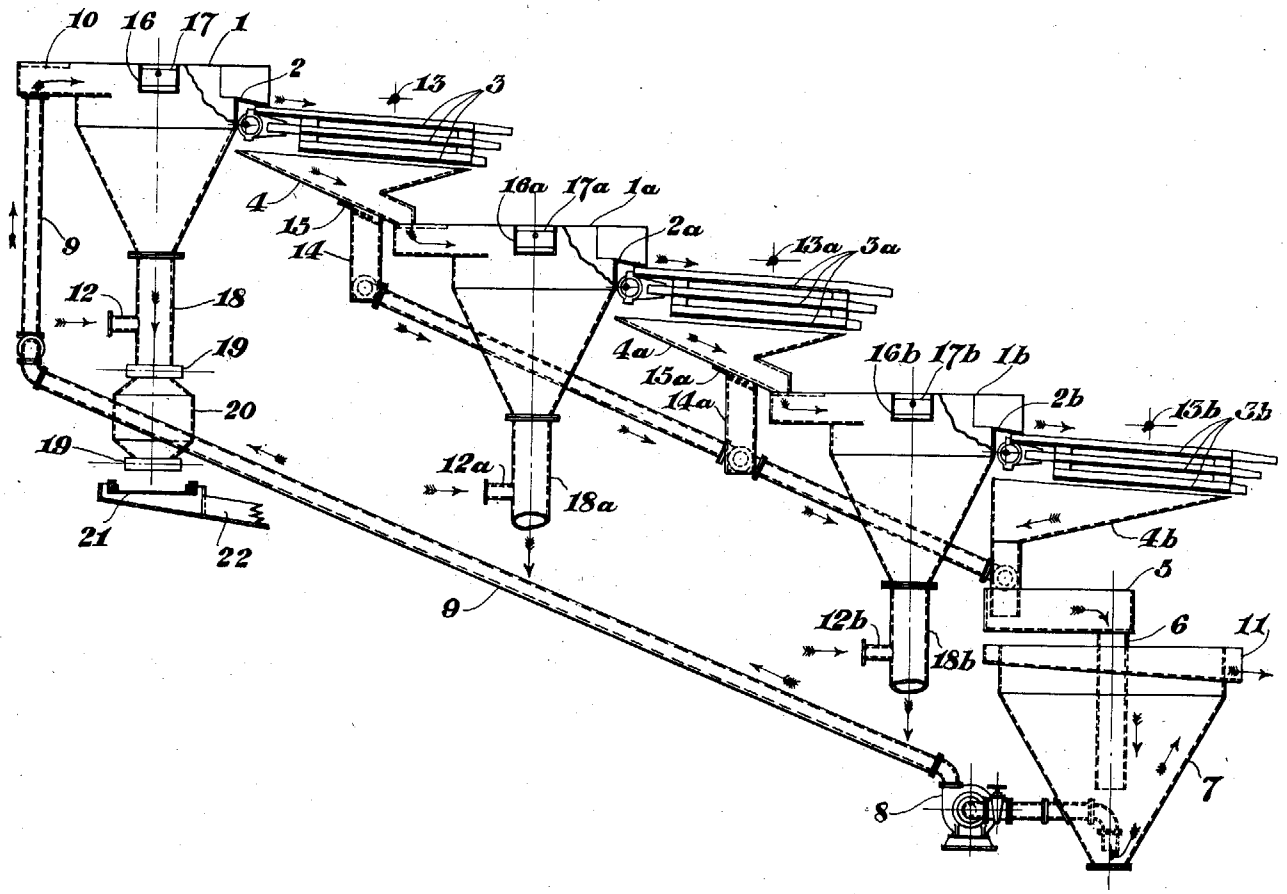
Witnesses:
H. M. Chance
C. K. Schulze
Inventor
Thomas M. Chance Reissued Nov. 18, 1930 Re. 17,873

UNITED STATES PATENT OFFICE

THOMAS M. CHANCE, OF MERION, PENNSYLVANIA

SEPARATION OF MATERIALS OF DIFFERENT SPECIFIC GRAVITIES

Original No. 1,685,521, dated September 25, 1928, Serial No. 202,030, filed June 28, 1927. Application for reissue filed August 15, 1930. Serial No. 475,609.

My invention relates to the separation of materials of different specific gravities by means of a fluid mass of relatively high specific gravity, as heretofore disclosed by me in Patents 1,224,138, May 1, 1917, Coal washing and ore concentration, and 1,559,937, November 3, 1925, Separating materials of different specific gravities, and particularly to that embodiment in which the materials floating in said fluid mass are carried through and out of the separating receptacle by means of a current of said fluid mass and water, the fluid mass and a portion of the water overflowing with said lighter material being returned to the separating receptacle for re-use therein. This current of fluid mass and water is thus used as a conveying element for the removal of said lighter materials.

My improvement consists in causing said conveying element to transport said lighter materials through a plurality of separators located with reference to each other in a vertically descending series adapted to establish a hydraulic gradient and a resultant velocity of flow that will convey the desired quantity of materials through the series, the overflow from the last separator being elevated and delivered into the first separator of the series, thus establishing a closed circuit method of operation.

In carrying out my invention the route of the fluid mass overflowing from each separator and also of the layer or body of water superposed upon said fluid mass, and discharging with the fluid mass, may be varied by returning it in whole or in part to any of the separators comprising the series.

The drawing is a vertical elevation and partly cross-sectional view illustrating diagrammatically an assemblage of structures in, by or through which my invention may be carried out.

In the drawing, 1 is a separating receptacle or receptacles adapted to contain a separating fluid mass of the described type, the floated material and admixed fluid mass together with water or other liquid flowing out through a weir or weirs 2, to impinge upon desanding and dewatering screen or screens 3, through which most of the sand and water passes and is diverted by launder and chute 4 into separating receptacle or receptacles $1^a$, the overflow from which passing out through weir or weirs $2^a$, upon desanding screen or screens $3^a$, similarly passes through $4^a$ into the separator $1^b$, and thence through $2^b$ and $3^b$ into stay-box 5, whence through conduit 6 it passes into the sand sump 7, from which sand and water are continuously removed and elevated by pump 8 through conduit 9 and delivered by inlet chute 10 into separating receptacle 1.

The said sump 7 is provided with water overflow 11, the return through conduit 6 including the sand and water elevated by pump 8 plus the fluid mass agitation water delivered to the various separating receptacles, as by conduits 12, $12^a$ and $12^b$, and the spray water delivered to the various screens by sprays 13, $13^a$, and $13^b$, and this excess water rises and discharges through 11, either to waste or for re-use. By-passes for sand and water are indicated by 14 and $14^a$, fitted with regulating gates 15 and $15^a$, and by-passes for water only, by 16, $16^a$ and $16^b$, fitted with regulating gates 17, $17^a$, and $17^b$.

The separating receptacles may be of any desired shape adapted to contain and maintain the requisite separating fluid mass and may be fitted with any desired means for removing the materials heavier than said fluid mass and sinking therein, the numerals 18, $18^a$ and $18^b$ indicating conduits through which such heavy materials may be discharged. One method of removing the refuse is shown in conjunction with separator 1, in which intermittently operated slide valves 19 are fitted to refuse chamber 20, the refuse finally discharging on descending shaker 21, which in turn passes sand recovered therefrom to sand chute 22 for return if desired to sump 7.

The drawing shows 3 separating receptacles each of which is provided with its own set of screens for sizing and desanding the coal fed into each unit, so that the product of each separator is a finished product requiring only desanding and sizing for shipment to market, in some cases some particular size might be retreated by sand flotation or some other method before shipment. The drawing does not illustrate however any means for such retreatment. The layout as shown by the drawing is especially well adapted to either the treatment of anthracite or bituminous coal in that in anthracite the smaller or steam sizes constitute roughly about one-third of the quantity to be treated and in soft coal the slack is frequently of about the same relative quantity, so that this layout may be advantageously utilized by dividing the coarser coal into two parts to be treated by the first two separating cones, the finer coal to be treated in the third separator and the first separator may be used for treating the coarser half of the mine output, the second separator for treating the half of the output constituting the smaller size, both the separators being operated to produce a finished product, the refuse from the first separator being crushed or otherwise broken down and retreated in the third separator for the production of clean refuse and a finished product, or a product of intermediate grade for retreatment in the second separator. In many cases one of the separating units can be eliminated, efficient separation being secured with two such units. While my invention primarily is designed for such or similar uses, it may also be used for other purposes and other methods of operation by changes or removal of some of the screens, thus, The screen sets 3, $3^a$ and $3^b$ illustrate several variations in the mode of operating the three separators 1, $1^a$ and $1^b$, as for example,—

1. Screen sets 3 may be removed and all floated material passed directly from 1 into $1^a$, the specific gravity of the fluid mass in 1 being adapted to float all high grade coal, low ash and high ash bony coal and laminated coal and slate, while the fluid mass in $1^a$ is sufficient to float coal of the desired quality, low ash bony coal etc. while permitting all heavier material to sink, to be removed through the discharge valves, for subsequent crushing and return to separator 1, $1^a$ or $1^b$, or for retreatment by any other process, while the floated coal is screened by screen $3^a$ into large, intermediate and smaller sizes, the two former for shipment to market while the finer sizes are passed into $1^b$ for treatment at a specific gravity that will give a high grade product and this is then sized into market sizes by screens $3^b$ and is dewatered and desanded, the water and sand going directly into 5 and 6 for elevation through 8, 9 and 10 to separator 1, or 2. Separators 1, $1^a$ and $1^b$ may each be fed with large, medium and small sizes of coal, the floated product of each being screened by 3, $3^a$ and $3^b$ into market sizes, the reject from each separator being crushed to smaller size and returned to the separators for retreatment, or 3. The screen sets 3 and $3^a$ can both be removed, the separator 1 discharging all high ash refuse through its refuse discharge, separator $1^a$ discharging bony and laminated coal through its refuse discharge for treatment by crushing the coarse material to smaller size and return to separator 1, separator $1^b$ discharging the coal for shipment in mixed sizes or screened into market sizes. By this method desanding screens 3, $3^a$ and $3^b$ are eliminated and the height through which the water and sand must be elevated is materially reduced.

Sand and water not removed by screens 3, $3^a$ or $3^b$ may be separated by additional screens or other means and returned to the circuit by discharge into sand sump 7. Sand and water recovered from the heavier material trapped out of the base of the separators may be returned to the circuit in the same manner.

The launders and chutes 4, $4^a$ and $4^b$ may be provided with means for feeding all or such portion of the sand and/or water as may be desired into the next succeeding separating receptacle or receptacles, all of which will be readily understood by those skilled in the art, the chutes 14 and $14^a$, fitted with gates 15 and $15^a$ providing such by-passes for the sand and water, and the chutes 16, $16^a$ and $16^b$, fitted with gates 17, $17^a$ and $17^b$, providing similar by-passes for the water only. It will be understood that, whereas the screens 3 receive only the intake of chute 10 plus the agitation water used in separator 1 and the spray water from sprays 13, the last screen in the series receives the summation of all the spray and agitation water used in the preceding series, unless some of this excess water is by-passed from the circuit. This excess water, if by-passed, may be sent directly to stay box 5 or, if free from sand, to the water overflow 11.

It will be understood that where a plurality of separating receptacles is used in series to retreat the products produced in the initial unit, the intervening desanding screen may be eliminated and the material floated in the one receptacle discharged directly, with its conveying volume of sand and water, into the next receptacle, the separating surfaces of the various fluid masses lying within the requisite hydraulic gradient to give the desired velocity of flow.

In operating the method of flotational separation by a fluid mass as described in the above mentioned patents, for separating coal from its intermixed impurities, the overflow of the layer of coal floating at the top of the separating fluid mass usually effects the discharge of the coal with minimum breakage. If the coal so cleaned requires retreatment at a different specific gravity to separate it into grades of different qualities, or requires separate treatment of different sizes, the use of a plurality of separators becomes necessary. Also, it is often necessary to use a plurality of separators treating material of like nature to accommodate the quantity of material to be separated. By my present invention, such plural separators are served by a single unit, such as a pump or other device, for reelevating the sand and water used as a conveying element. This single unit need have no greater volumetric capacity than that of each of the units that would be required for each of a plurality of separators individually operated. Hence if four such separators are installed, only one-fourth of the volumetric reelevating capacity necessary for individual operation would be required by my present method, and the power absorbed would likewise be greatly reduced, although the elevating head is slightly increased due to the necessary elevation to secure gravitational flow between the separators.

I have used this method commercially in preparing coal and its intermixed impurities for market by flotation of the coal in a fluid mass composed of an agitated mixture of sand and water and by the sinking of the intermixed impurities therethrough, reusing sand and water overflowing from one separating receptacle, in a separating receptacle located at a lower elevation.

If desired, the materials to be separated may be graded into a plurality of sizes before separation thereof, each size being fed to a separator in which the fluid mass is maintained at the specific gravity best adapted to separate the materials composing the size fed thereto, such variation in specific gravity producing cleaned coal adapted to meet the purposes for which each size is to be used, and this method of use of my present method has likewise been commercially applied by me.

The quantity of floating material which can be made to overflow the discharge weir depends largely upon the quantity of fluid mass and overlying water which is supplied to the separator and overflows the weir. The principles involved can be illustrated by describing the method as used in separating coal from its intermixed impurities. If a mixture of sand and water is fed, as through chute 10 into such separator at or adjacent to the top of the fluid mass constituting the separating medium, the sand grains of such mixture quickly settle through the slowly rising agitation water issuing upwardly from the fluid mass, and thus form an addition to the fluid mass. Coal floating in the fluid mass rises through this addition and floats at the top thereof, each piece projecting upwardly into the overlying water. To permit the slate to fall a sufficient distance below the coal to prevent it from being carried over the discharge weir, a more or less definite time interval must elapse between the time the coal is fed into the apparatus and the time it is discharged over the weir, and the surface velocity of flow through the separators must be at such rate as to permit the coal to remain in the separating receptacle for such time interval. If, for example, the period necessary for separation is 5 seconds, and the distance the coal must travel from the point of feed to the point of discharge is 15 feet the velocity of flow within the body of the separator should not be greater than 3 feet per second, but if separation be effected in 3 seconds a velocity of 5 feet per second is permissible. The capacity to take and discharge feed will of course depend upon this velocity and upon the average cross-sectional area of the moving mass of coal within the separator.

In the operation of a series of separators in which the water and fluid mass overflowing from the first separator are used for the operation of one or more separators, it is important that all of the separators in the series receive a sufficient volume of water and fluid mass to successfully separate the coal fed into each of the said separators, and that the time interval in each during which separation is effected be sufficient for proper separation of the material fed into it, which in turn requires the establishing and maintenance of a proper velocity of flow both within the body of the separator and through the discharge weir of each separator. As the velocity of flow depends upon the drop of hydraulic gradient established for each of the separators in the series, the providing of a proper hydraulic gradient is essential to continuous and satisfactory operation of the series as a whole. Control of said hydraulic gradient, in plant of fixed design, may be effected by the regulation of weirs 2, $2^a$ and $2^b$, the adjustment of the various by-passes previously described and the regulation of the quantity of sand and water re-elevated.

The conveying element of my present invention performs the functions of a mechanical conveyor such as a chain scraper line, but differs radically from all forms of mechanical conveyors. In mechanical conveyors the velocity of movement is equal along the entire line whereas in my conveying element the velocity of movement can be varied at will, some portions thereof moving at high velocity while other portions move at relatively slow speed. My conveying element can neither push nor pull the materials to be moved, the operative portion being actuated solely by energy supplied by gravity, but its velocity may be increased or decreased at will by varying the hydraulic gradient in different portions thereof. Energy from an extraneous source of power is applied solely in elevating the materials of the conveying medium and this force is expended in the inoperative portion of the circuit.

The drawing, illustrates an embodiment of my invention in which the sand and water to be used as a conveying element is separated from the added agitation and spray water before return to separating receptacle by pump 8, sump 7, serving to perform this separating function. It will be understood that sump 7 may be located above the first separating receptacle 1, and discharge the conveying element constituents directly into chute 10 through a controlled spigot, pump 8 in this event pumping the underflow from screen $3^b$ and the various by-passes, and discharging into stay-box 5, said pump being made of sufficient capacity to re-elevate the conveying element, plus the agitation and spray water discharged through the various desanding screens, such as 3, $3^a$ and $3^b$. If this construction be adopted, overflow 11 of sump 7 may be located at sufficient elevation above separating receptacle 1 to pass the agitation water directly into the various separating receptacles without re-pumping. Under these conditions, pump 8 serves as a re-elevating device for both the conveying element, the agitation and the spray water.

While the chutes 10, 4 and $4^a$ are shown discharging the conveying element into the upper portion of the fluid mass, this is not a condition essential to the operation of my invention. In the separation of very light materials, where low specific gravities of the separating fluid mass are required, it may be desirable to use all or a portion of the conveying element to assist in the agitation of the fluid mass. Under these conditions said conveying element is introduced at sufficient depth below the upper surface of the separating fluid mass, and under the requisite pressure, to impart the desired agitational work to said fluid mass. If this procedure be adopted, a reduction in the agitation water that would be otherwise required may be made equal to the amount of energy secured from the use of said conveying element as an agitational agent.

In operating my invention the overflow 11 or other outlet from sand sump 7 may be utilized to remove silt and fine light solids as described by me in the reissue of Patent No. 1,559,938, November 3, 1925, Apparatus for separating materials of different specific gravities.

The sand sump 7 must be large enough to hold a supply of sand to replace that lost from the system by failure to thoroughly desand the separated materials discharged from the plant or lost through overflow 11 from the sand sump and also to accommodate sand of the plural fluid masses which may be displaced therefrom by failure to remove separated materials through over-feeding or other cause.

The sand thus held in storage may be maintained as a fluid mass having a specific gravity sufficient to float lighter material accumulating therein, the water rising through said fluid mass having sufficient velocity to expel therefrom those lighter particles which are slightly larger and those that are smaller than the particles of sand. Such expelled particles then form a secondary fluid mass superposed above the sand and can be removed from the sand sump by the overflow or by tapping off below the level thereof. This also assists in maintaining maximum capacity to accommodate sand and hold it as a storage reservoir common to all of the plural fluid masses.

The area of the upper portion of the sand sump 7 must be so proportioned to the total volume of water that passes upwardly to overflow 11 that the velocity of said water will not carry undesirable volumes of sand out of said sump. To assist in maintaining this condition, the upwardly rising water may be limited in quantity by employing the water by-passes 16, $16^a$ and $16^b$, under which method of operation, the area of the sand sump need be no greater for a plurality of separating units than if but one such unit were used.

One important embodiment of my invention therefore is this combination of structures and means whereby a plurality of separating fluid masses may be served by moderate sand sump volumetric capacity which may be utilized, 1, as a sand storage reservoir common to all of said plural fluid masses, 2, as a clarifier to prepare water for reuse in agitating said fluid masses and in washing the separated materials, 3, for reconditioning and cleaning the sand for reuse by the removal of small particles of lighter materials, 4, as a storage reservoir to insure uniformity and certainty of supply of water and sand for continuous functioning of the conveying element as already described, 5, for the recovery as a separate product of small particles of the lighter materials, 6, to insure automatic functioning of the absorption of sand by, and of its discharge from, the sand sump as sand is displaced from, and is reabsorbed by, said plural fluid masses, this being attained by proper proportioning of the sand sump structure and of the volume pumped from the lower part thereof, and/or proper adjustment of the by-passes to limit the quantity of upwardly rising water in the sand sump to that required for maintaining proper fluidity therein without causing undesirable losses of sand through overflow 11.

It will of course be understood that sand sump 7, pump 8 and conduit 9 may be replaced by such plurality of said devices as it may be desired to use, in which event the combined capacity of the plural members need be no greater than that required for a single unit. In the same way, the separating receptacles 1, 1[a] and 1[b] and screens 3, 3[a] and 3[b] may be constructed as plural units, each operating in parallel, and discharging either to a single sand sump 7 or to a plurality of said sumps, the drawing, being a purely diagrammatic arrangement of one form of the general association of elements necessary to my invention.

In the specification and claims hereof the term "sand" is intended to mean appreciably coarse granular insoluble material heavier than the liquid used and suitable for making a fluid mass of the described type, and the terms "water" and "liquid" are intended to mean any liquid suitable for making a fluid mass of the described type.

Having described my invention, I claim:

1. A method of separating materials of different specific gravities which consists in immersing said materials in a fluid mass consisting of an agitated mixture of liquid and comminuted solids heavier than said liquid and substantially insoluble therein and having a specific gravity intermediate that of the lighter and heavier of said materials, in providing a plurality of individual fluid masses of the described type, in locating the top of said fluid masses at vertically differing elevations, said differences in elevation depending upon the horizontal distances separating said bodies, in proportioning the gradients between said fluid masses to permit the free flow of liquids by gravity from the top of the fluid mass at a higher elevation to that of one at a lower elevation, in separately feeding into each of said fluid masses materials to be separated thereby, in causing a mixture of comminuted solids and liquid to be circulated from a body of such mixture located at an elevation below said fluid masses into and across the higher of said fluid masses, in separating lighter materials transported by said fluid mixture away from said fluid mass from the constituents of said mixture and of said fluid mass intermixed therewith, in then passing said circulating mixture into and across the top of another of said plural separating fluid masses, in separating the lighter materials carried away from said second fluid mass by said circulating mixture, and in returning said circulating mixture, after the removal of said lighter materials into the said body of said mixture located at said lower level.

2. Apparatus for separating materials of different specific gravities comprising in combination a plurality of receptacles adapted to contain fluid masses consisting of an agitated mixture of liquid and comminuted solids heavier than said liquid and substantially insoluble therein and having specific gravities intermediate that of the lighter and heavier of said materals, fluid masses of the described type in said plural receptacles, said receptacles being located in a descending series of steps, the vertical height of said steps being proportioned to the horizontal distance separating said receptacles, means for accommodating the free flow of liquids by gravity from the discharge of each receptacle to a receptacle at a lower elevation than said first receptacle, means for feeding into each of said fluid masses materials to be separated thereby, means for circulating a mixture of comminuted solids and liquid from a container holding a body of such mixture and located below said fluid masses, into and across the higher of said fluid masses, a container adapted to contain said body, means for separating lighter materials transported away from said first fluid mass by said circulating mixture, from the constituents of said mixture and of said fluid mass intermixed therewith, means for passing the mixture after the removal therefrom of the lighter materials into and across the top of another of said plural separating fluid masses, means for separating the lighter materials carried by said circulating mixture through the outlet from said second receptacle from the comminuted solids and liquid intermixed therewith, and means for returning said circulating mixture after removal of said lighter materials into the body of said mixture in said container, and means for effecting the circulation of said mixture by the application of power extraneously applied to said mixture.

3. Apparatus for separating coal from impurities intermixed therewith comprising in combination a plurality of receptacles adapted to contain fluid masses consisting of an agitated mixture of liquid and comminuted solids heavier than said liquid and substantially insoluble therein and having specific gravities intermediate that of said coal and intermixed impurities, fluid masses of the described type in said plural receptacles, said receptacles being located in a descending series of steps, the vertical height of said steps being proportioned to the horizontal distance separating said receptacles, means for accommodating the free flow of liquids by gravity from the discharge of each receptacle to a receptacle at a lower elevation than said first receptacle, means for feeding into each of said fluid masses coal and intermixed impurities, means for circulating a mixture of comminuted solids and liquid from a container holding a body of such mixture and located below said fluid masses, into and across the higher of said fluid masses, a container adapted to contain said body, means for separating coal transported away from said first fluid mass by said circulating mixture, from the constituents of said mixture and of said fluid mass intermixed therewith, means for passing the mixture after the removal of said coal into and across the top of another of said plural separating fluid masses, means for separating coal carried by said circulating mixture through the outlet from said second receptacle from the comminuted solids and liquid intermixed therewith, means for returning said circulating mixture after removal of said coal into the body of said mixture in said container, means for effecting the circulation of said mixture by the application of power extraneously applied to said mixture, and means for removing said impurities from the lower part of said separating receptacles.

4. In a method for separating materials of different specific gravities by the flotation of the lighter and the sinking of the heavier of said materials in a separating fluid mass consisting of an agitated mixture of liquid and comminuted solids heavier than said liquid and substantially insoluble therein and having a specific gravity greater than the lighter and less than the heavier of said materials which consists in providing a plurality of separating fluid masses spaced apart laterally and with their surfaces at different elevations proportioned relative to said spacing to provide a determined hydraulic gradient to effect flow of liquids by gravity from the top of one fluid mass to the next lower; maintaining upon each of said fluid masses a superposed body of said liquid; restraining the overflow of said bodies of liquid to maintain predetermined depths thereto; feeding materials to be separated into the first of said fluid masses; causing an upper layer of said first named fluid mass in which the lighter of said materials are floating together with liquid of said superposed body to flow away from said first fluid mass whereby said flowing liquid and said flowing layer serve to transport said floating materials therefrom; causing liquid to be introduced into and rise through each of said fluid masses to serve as an agitating agent and to accumulate upon the surface thereof to assist in maintaining said superposed bodies of liquid; separating from said conveying element lighter materials transported thereby; and returning to said first fluid mass constituents of said conveying element, to replenish said first fluid mass and to maintain said superposed body of liquid thereon.

5. A method according to claim 4 in which constituents of the conveying element are introduced into the separating fluid mass below the surface thereof under pressure sufficient to impart additional agitational work to the fluid mass.

6. Apparatus for separating materials of different specific gravities comprising in combination a plurality of receptacles adapted to accommodate separating fluid masses consisting of agitated mixtures of liquid and comminuted solids heavier than said liquid and substantially insoluble therein, and having specific gravities greater than the lighter and less than the heavier of said materials; separating fluid masses of the described type in each of said receptacles, said receptacles being provided with weirs for the outflowing of liquids and solids and materials floating therein; said receptacles being placed a definite distance apart, and each of said receptacles being placed a definite distance below the next above it, said distances and said elevations being so proportioned as to provide predetermined hydraulic gradients from each of said receptacles to that next below it; means for restraining the outflowing of said separating fluid masses and of liquid superposed thereon to maintain predetermined depth of overflow to said bodies and to said superposed liquid; means for feeding materials to be separated into the first of said fluid masses; means for conveying materials outflowing from said receptacles and for transporting said materials therein; means for conveying the constituents of outflowing fluid masses and superposed liquid into another of said receptacles located below said first receptacle; means for introducing liquid under pressure into said receptacles below said fluid masses; means for separating from said fluid mass and superposed liquid the lighter materials transported thereby; means for returning to said first fluid mass those constituents of said fluid mass utilized as a conveying element; and means for superposing upon said fluid mass liquid required for said conveying element.

7. In a method for separating materials of different specific gravities by the flotation of the lighter and the sinking of the heavier of said materials in a separating fluid mass consisting of an agitated mixture of liquid and comminuted solids heavier than said liquid and substantially insoluble therein, said fluid mass being agitated by liquid introduced under pressure below it and rising therethrough, whereby its specific gravity is maintained and controlled at a density greater than the lighter and less than the heavier of said materials, and in which lighter materials floating in the upper part of said fluid mass together with that portion of the fluid mass in which they are floating, flow by gravity out of and away from said fluid mass, assisted by the outflowing of liquid superposed upon said fluid mass, said outflowing fluid mass and said outflowing liquid acting as a conveying element to convey said floating lighter materials out of and away from said fluid mass, and in which said lighter materials are separated from the constituents of said conveying element and a portion of the constituents of said conveying element substantially equal to those discharged are returned to said fluid mass and liquid superposed thereon, the improvement which consists in introducing portions of the constituents of said conveying element below the upper surface of the separating fluid mass under a pressure that will impart additional work to said fluid mass, whereby the liquid introduced below under pressure to effect agitation may be reduced by a quantity proportional to the energy imparted by causing said conveying element to function as an agitational agent; in feeding materials to be separated into said fluid mass; in causing said fluid mass so agitated to float the lighter of said materials and, assisted by said outflowing superposed liquid, to discharge said materials therefrom.

THOMAS M. CHANCE.